United States Patent [19]
Jensen

[11] Patent Number: 4,969,122
[45] Date of Patent: Nov. 6, 1990

[54] APPARATUS FOR PAGE TAGGING IN A COMPUTER SYSTEM

[75] Inventor: Eric H. Jensen, Livermore, Calif.

[73] Assignee: Sun Microsystems, Inc., Mountain View, Calif.

[21] Appl. No.: 400,122

[22] Filed: Aug. 21, 1989

[51] Int. Cl.$^5$ .............................................. G11C 15/00
[52] U.S. Cl. .................................. 365/49; 365/189.01
[58] Field of Search ................ 365/49, 230.01, 230.03, 365/230.06, 189.07, 189.01, 238.5

[56] References Cited

U.S. PATENT DOCUMENTS

3,845,474 10/1974 Lange et al. ........................... 365/49
4,168,541 9/1979 DeKarskr ......................... 365/49 X

*Primary Examiner*—Joseph A. Popek
*Attorney, Agent, or Firm*—Blakely, Sokoloff, Taylor & Zafman

[57] ABSTRACT

A caching system which includes a main memory divided into a predetermined number of pages having a predetermined number of columns and lines of storage elements, a cache memory haivng the same number of lines of storage elements as the pages of main memory and a number of columns sufficient to store the information in any line of main memory plus the address of the information in main memory, apparatus for transferring between cache memory and main memory information and addresses indicative of the position in main memory represented by any particular information in cache memory, the addresses including an offset indicating the particular line of the page of main memory and a number of bits indicating only one of a limited number of pages which may be stored in the cache at one time, and a page number cache having a line number equal to the number of pages which may be stored in the cache and a column number sufficient to store the tag address of a line stored in the cache.

7 Claims, 2 Drawing Sheets

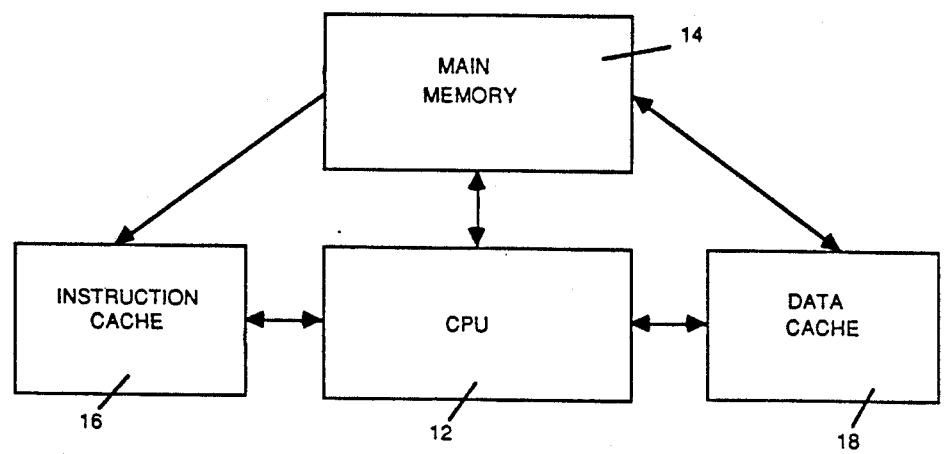
FIGURE 1 - PRIOR ART
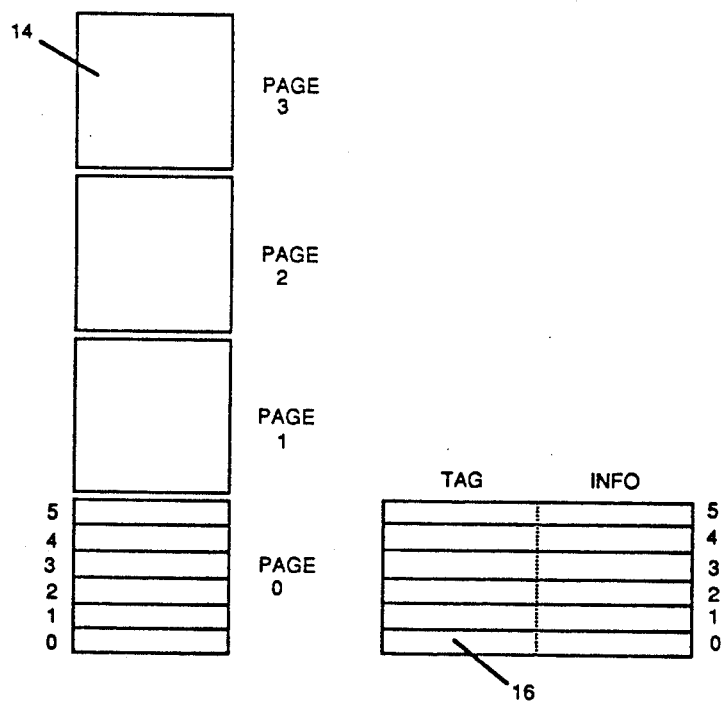
FIGURE 2 - PRIOR ART

APPARATUS FOR PAGE TAGGING IN A COMPUTER SYSTEM

BACKGROUND OF THE INVENTION

1. Field of the Invention

This invention relates to computer systems and, more particularly, to methods and apparatus for addressing information in caches used by computer system.

2. History of the Prior Art

Caches are used in computer systems to speed the overall operation of the system. The theory of a cache is that a system attains a higher speed by using a small portion of very fast random access memory (RAM) as a cache along with a larger amount of slower main memory RAM. If data and instructions are called from main memory and placed in cache memory as they are required by the program, and if the system looks first to the cache memory to see if the information required is available there, then the system will usually find the information desired in the cache memory and will, consequently, operate at a speed as though it were made up mostly of high speed cache memory. This usually happens because, statistically, information in any particular portion of a process which has just been used is more likely to be required immediately than is other information which has not been recently used.

There have been many forms of caching systems devised by the prior art. One way to design a cache memory used in a demand paged virtual memory system is to give the cache memory the same size as one of the main memory pages. When, in such a system, information is taken from main memory and placed in a cache, it may be stored in the same line of the cache memory as the line of the page from which it was accessed in main memory. The information may be stored in the cache memory along with its page address in main memory. Each line of the cache memory in such a system may come from any particular page of main memory so that lines lying adjacent each other in cache memory may have entirely different page addresses. The page address is stored as part of a tag field, a series of high order bits of the address which in addition to the page designation include protection and control information such as whether the information is read or write protected and whether the information is valid. In a particular system, such a tag field may require approximately sixteen bits to represent the tag information.

Then a system capable of accessing any line in a cache memory may determine whether the required information is in the cache memory (whether there is a hit) by looking to the particular line designated in the address sought to see whether the correct page number is stored in the tag field. If the virtual page address at the desired line in the cache memory matches the desired virtual page address, then there is a hit; and the information in the cache memory is used without the necessity of going to main memory. If the information is not present in cache memory, then the system must delay, go to the main memory, replace the particular line in the cache memory, and then operate on the information.

Since the hit rate usually runs as high as ninety-five percent, some computer systems using pipelining procedures go ahead and process the information found at the addressed line of the cache without waiting for the tag comparison to determine if the information has the correct virtual page address in order to eliminate in most cases the time taken for a tag comparison. While the information is being processed, the tag comparison is conducted; and, if there is a miss, the incorrect information is simply dumped. Overall, this is faster than conducting the tag comparison first for each address in the cache.

Of course, such a system does have disadvantages. When there is miss in the cache memory, several clock times may have passed before main memory is accessed for the missed information. Moreover, the pipelining system must contain sufficient additional pipeline stages to allow incorrect information to overflow and be dumped. Moreover, the system uses quite a bit of address space in the cache memory to provide the space necessary for the tags to designate pages of main memory and control and protection information.

SUMMARY OF THE INVENTION

It is, therefore, a general object of the present invention to improve and speed the operation of computer systems.

It is an additional object of the present invention to reduce the size and increase the speed of cache memory used in a computer system.

These and other objects of the invention are realized by a caching arrangement for use with a computer system which includes a main memory divided into a predetermined number of pages having a predetermined number of lines of a predetermined line size comprising a cache memory having the same number of lines of storage elements as the pages of main memory and a line size sufficient to store at least the information in any line of main memory plus the tag field for the information in main memory, the tag field including a number of bits each indicating only one of a limited number of pages which may be stored in the cache memory at one time, a page tag cache having a line number equal to the limited number of pages which may be stored in the cache memory at one time and a line size sufficient to store the tag field including the virtual page address of a line stored in the cache memory, and means for searching the page tag cache for virtual addresses of information stored in the cache memory.

Such a system reduces the size of address space needed in the cache memory by eliminating most of the storage required to store virtual page tags and speeds the operation of the system by allowing accesses to main memory to commence sooner and cache memory invalidation to proceed more rapidly than in prior art systems.

These and other objects and features of the invention will become apparent to those skilled in the art by reference to the following detailed description taken together with the several figures of the drawing in which like elements have been referred to by like designations throughout the several views.

BRIEF DESCRIPTION OF THE DRAWINGS

FIG. 1 is a drawing illustrating a prior art form of caching system for a computer memory;

FIG. 2 is a block diagram illustrating the makeup of main and cache memories in a prior art caching system such as that illustrated in FIG. 1.

NOTATION AND NOMENCLATURE

Figure 3:
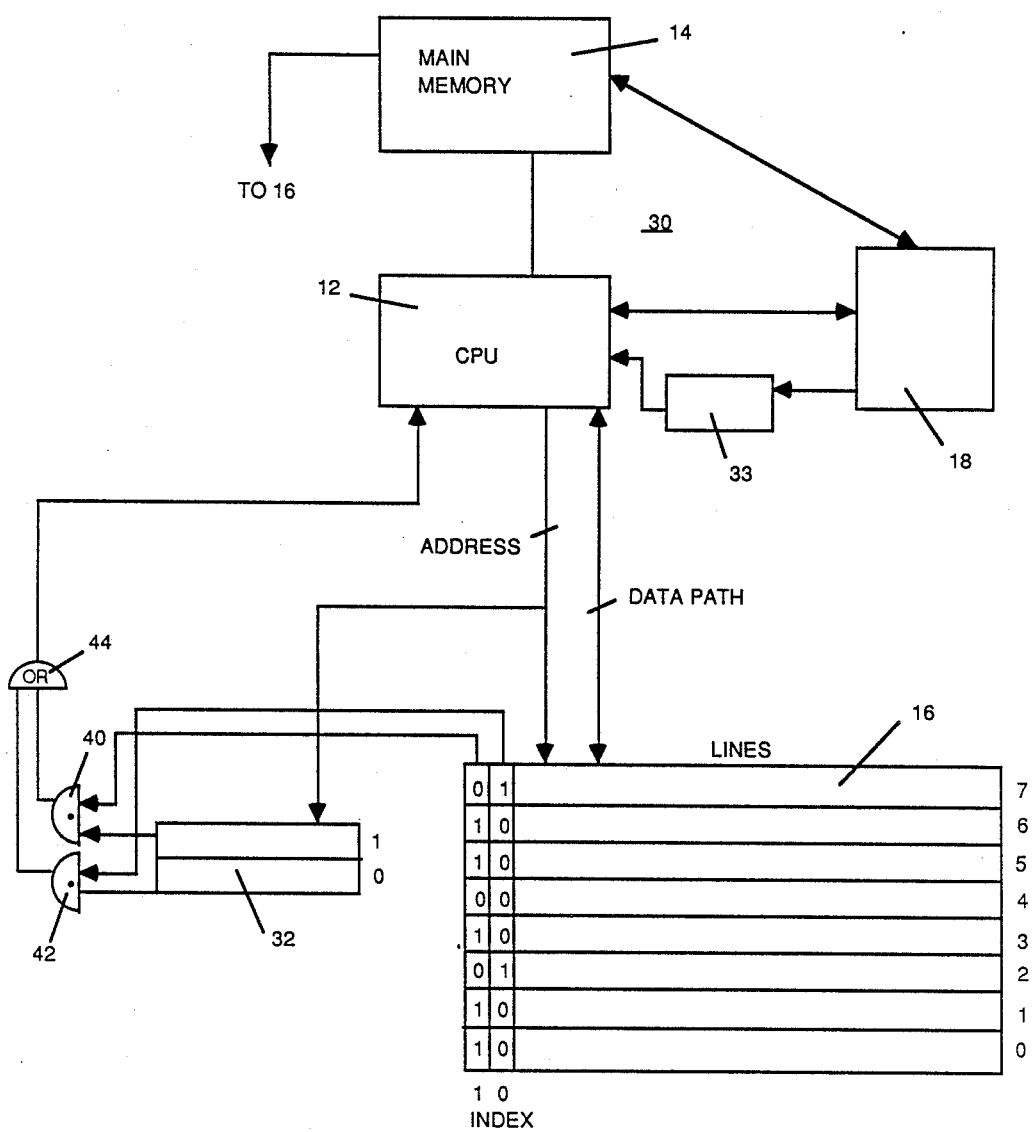
FIG. 3 is a block diagram illustrating a caching system in accordance with the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. The algorithms presented herein are not inherently related to any particular computer or other apparatus.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention describes apparatus and method steps for operating a computer in processing electrical or other (e.g. mechanical, chemical) physical signals to generate other desired physical signals.

DESCRIPTION OF THE PREFERRED EMBODIMENT

Referring now to FIG. 1 there is shown in block diagram form a portion of a computer memory caching systems utilized in the prior art. The system 10 illustrated is one which is referred to as a direct mapped caching system; such a system is described for ease of description only, and the invention should not be considered to be limited to such a system. In discussing the system 10, various values are utilized in describing portions of the system which are for illustrative purposes only. The system 10 illustrated includes a central processing unit (CPU) 12, a main memory 14, an instruction cache memory 16, and a data cache memory 18. Although instructions and data are often sequestered in individual cache memories as are shown in FIG. 1, this is not always the case nor is it necessary to the implementation of the invention that this be true. In some systems of the prior art using cache memories, the main memory 14 is divided into a number of fixed pages of a predetermined size, height, and width. Then, each of the cache memories is arranged to provide storage for the information in one page of main memory. In other words, main memory size is essentially a multiple of cache memory size. This is illustrated in the drawing of FIG. 2 where main memory 14 is shown divided, for example, into four individual pages designated pages 0–3. Each page is of the same height; that is, each page has the same number of lines of storage. Each page is of the same width; that is, each line contains the same number of bits (four bytes or one word of information storage in an exemplary system). Consequently, any word in the main memory 14 may be addressed by designating its page number and its line.

When, in such a system, information is taken from main memory 14 and placed in one of the cache memories 16 or 18 (whether the cache memory be used for instructions, data, or both), the information and the virtual page address of that information in main memory 14 is stored at the same line of the cache memory as the line from which it was derived in the page of the main memory. With this addressing scheme, the CPU 12 can determine whether any information required to be accessed is in the cache memory (whether there is a hit) by simply addressing the line of the cache memory to see whether the virtual page address is present.

The virtual page address is stored as part of a tag field, a series of high order bits of the address which in addition to the page address include protection and control information such as whether the information may be read or written to and by whom. In a preferred system, such a tag field may require approximately sixteen bits to represent the tag information. It should be understood that with such a system each line of either of the cache memories 16 or 18 may come from any particular page of main memory 14. Consequently, lines lying adjacent each other in cache memory may have entirely different tags.

In the cache memory 16 illustrated in FIG. 2, this virtual page address information is stored in that portion of each line shown to the left edge of the cache memory 16 in the Figure, that additional space beyond the space required for the storage of the instruction or the data on each line. It will be understood that the portion of the cache memory 16 necessary to accommodate the tag portion of the address is relatively significant; for example, if main memory contains $2^{16}$ pages of storage, then this tag requires 16 bits of storage. Since cache memory is involved, the hardware used to implement this address space is also fast memory which is expensive.

When the CPU 12 first looks to the cache memories 16 or 18 to determine whether any required information is present, a comparison of the desired address with the addresses of the information stored in cache memory is made. This is done by first comparing the line address sought with the lines of the cache memory to select the correct line. When the correct line has been selected, the virtual page address sought is compared to the virtual page address of the tag field stored at that line of the cache memory 16. If an address in the cache memory 16 matches the desired address in page and line number (and in some systems, line position), then there is a hit; and the information in the cache memory is used without the necessity of going to the main memory 14 to complete the search. If the information is not present in the cache memory, then the system must, after the check, go to the main memory 14 to secure the information and replace the particular line in the cache memory 16. Only then can the CPU 12 operate on the information.

As was explained above, in order to eliminate the time loss normally required for a tag field comparison, some computer systems using pipelining processes begin to operate on the information found at the addressed line of the cache memory without waiting for the tag comparison to be completed. While the information is being processed, the tag comparison is conducted; and, if there is a miss, the incorrect information in the processing pipeline is simply dumped. Overall, this is faster than conducting the tag comparison first for each address in the cache because the hit rate usually runs as high as ninety-five percent so retrieval from main memory is only required on an average of every twenty times. However, the system has some disadvantages. When there is a miss in cache memory, several clock cycles may have passed before main memory 12 is accessed for the missed information. Moreover, the pipelining system must contain sufficient stages to allow any incorrect information to overflow and be dumped; this is an additional system cost. Finally, the system uses quite a bit of address space in the cache memory to provide the space necessary for the tags to designate page addresses of main memory, protections, and the like.

FIG. 3 illustrates a caching system 30 devised in accordance with the present invention which substantially reduces these problems. The system 30 illustrated in FIG. 3 includes a CPU 12, a main memory 14, an instruction cache memory 16, and a data cache memory 18 all as illustrated in FIG. 1. Associated with the cache memory 16 is a first page tag cache 32. Associated with the data cache memory 18 is a second page tag cache 33. For ease of discussion, only one of the cache memories 16 and its associated page tag cache 32 are illustrated in FIG. 3.

The system 30 illustrated in FIG. 3 operates much like that of the prior art. Information stored in main memory 14 is, when required by a process, stored in one of the cache memories along with its tag. However, in the system 30, the data stored in the tag field at each line in the cache memory 16 to represent the virtual page address comprise only a small number of the bits normally used to represent the page address. In order to accomplish this, rather than allowing lines from all of the pages in main memory to be stored in one of the cache memories, the system 30 allows information from only a small number of pages of the main memory 14 (for example, two pages) to be stored in one of the cache memories at one time.

Thus, if the main memory 14, for example, included sixteen individual pages of memory, only two of these pages could be represented in a particular cache memory at the same time. Although this restriction may appear to be limiting, the same statistical information which allows hit rates as high as ninety-five percent argues that in most programs, information necessary within particular segments of processes will often fall into one, two, or three pages of main memory. In a preferred embodiment having over 65,000 pages of storage, the information in the instruction cache falls into four pages of main memory while the information in the data cache falls into twelve to sixteen pages of main memory. Consequently, such a restriction, at least with a divided caching system holding instructions and data in different caches, places little limitation on the system.

The advantages of this restriction are great, however. By allowing only information from two pages of main memory (or some other small number) to reside in cache memory at one time, only two bits (one bit per page) need be used to designate in the tag field of the cache memory the page from which the information came and the various control and protection bits thereby eliminating approximately sixteen bits from each line of the cache memory. This is possible because each one of the two bits represents one or the other of two lines in the associated page tag cache 32.

Each page tag cache 32 is constructed as illustrated in FIG. 3 with two lines of storage, each line having a sufficient number of bits to record the entire tag field including the virtual page address of one of the pages of main memory residing in the associated cache memory 32. Thus, essentially the entire tag address field is removed from the cache memories and placed in the page tag cache where it appears but once instead of as many times as there are lines in the cache memory. This is a significant savings in fast, high priced memory.

Instead of the full tag address field, the tag address field in the cache memory 16 used for illustration herein holds only a one or a zero in each of the two bit positions indicating the particular pages of main memory 14. If a one appears in the first position (as shown in line 0 of the cache memory 16 illustrated in FIG. 3), this indicates the page in the upper of the two lines of the associated page tag cache 32. If the second bit position holds a one, then the lower of the two lines of the associated page tag cache 32 is indicated. If neither tag position in the cache memory 16 holds a one, this may be used to indicate that the information in that line of the cache memory is invalid and is not to be used in any process.

If, in accessing a particular line of the cache memory 16, a one appears in a particular position of the tag address in the cache memory, the page tag cache 32 then provides the virtual page identification and the protection and control information for that line of the cache memory 16. Since the cache memories 16 and 18 in this example are each restricted to only two pages apiece of main memory, the upper line of each page tag cache provides an address area sufficient for all lines in that particular page in the cache memory 16 while the lower line does the same for the lines of the other page which may be represented in the cache memory 16 at any one time.

As in prior art systems, a check for a hit is made by going to the line designated in the virtual address sought and reading the line. The tag bits in that line then indicate either the appropriate page address or that the information is invalid. If a page is indicated, the tag bits direct the comparison to the appropriate line of the page tag cache 32. The page tag cache 32 provides a match signal on the one of two match lines which holds the appropriate page address. This match signal is provided to either AND gate 40 or 42. The AND gate 40 or 42 also receives at the same time the output from the tag bits of the cache memory 16. The appropriate AND gate 40 or 42 provides an output to an OR gate 44 signifying that there is a tag address match and a hit. If neither page tag cache line holds a matching tag address or if the information is invalid, there is no match; and the CPU 12 must go to the main memory for the required information.

If an attempted access of the cache memory indicates a miss so that there is a need to access information outside the limited number of pages of main memory stored in that cache memory, it is necessary to replace one or the other of the pages presently stored in the cache memory with information from another page of main memory. In a preferred embodiment of the invention this is accomplished by utilizing cache memory which may be flash cleared in a manner well known to the prior art. Such memory, essentially, may have bit positions in all lines carrying particular bits changed in parallel. For example, all of the lines having a one in the first tag bit position might be set to zero in that bit position. As indicated above, if zeroes appear in both bit positions used in the cache memory 16 to indicate the virtual page address, this may be used to indicate that the information is invalid at that page. Consequently, when the CPU next looks at the particular line and finds the invalid indication for the information, it may write a new page to that line of the cache memory 16.

An additional advantage of the invention is also provided by the use of the page tag cache of this invention. In computer memory systems which utilize multiple processors and virtual memory, it is often necessary to label information in a local cache memory stale because the same information in another cache memory has been written to since the information was placed in this local cache. In a system using a page tag cache, the coherency of information may be tested against the information in tag field of the page tag cache rather than the cache memory. In this manner, the cache memories need not be taken over during the time that such a check is conducted. This can mean that there is no loss of system clock time involved in conducting a coherency check of a local cache memory.

Moreover, a case may exist in which the information in the cache is no longer useful for a particular access but the tag field is contained in the page tag cache. In such a case, the flash clear process may be avoided, the correct data and tag field placed in the cache.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A cache page tagging apparatus for use in a computer system, said computer system having at least a central processing unit (CPU) and a main memory, said main memory being divided into a first pre-determined number of pages, each of said pages having a pre-determined number of lines and columns of storage elements, said apparatus comprising:

a cache memory coupled to said CPU having a second predetermined number of pages, said second number of pre-determined pages being less than said first number of pre-determined pages, each of said second number of pre-determined pages having a same number of lines of storage elements as the number of the lines in each of said pages of main memory, each of said lines of storage elements in said cache memory having storage capacity sufficient to store the information in any line of main memory plus a page tag field for the information in main memory, said page tag including a number of bits, each of said bits corresponding one of said second pre-determined number of pages;

a page tag cache coupled to said CPU and said cache memory, said page tag cache having a number of lines equal to said second pre-determined number of pages and storage capacity sufficient to store at least said page tag field of any line stored in said cache memory; and search means coupled between said page tag cache and said CPU for searching said page tag cache for addresses of information stored in said cache memory.

2. The apparatus of claim 1 wherein said page tag field includes two bits of storage.

3. The apparatus of claim 1 wherein said second predetermined number of pages is no more than three.

4. The apparatus of claim 1 wherein said page tag field includes means for designating information stored in said cache memory as being invalid.

5. The apparatus of claim 4 wherein said means for designating information invalid includes bits normally designating one of said second predetermined number of pages of said cache memory.

6. The apparatus of claim 1 wherein said page tag cache is formed of content addressable memory.

7. The apparatus of claim 1 wherein said cache memory is designed such that said page tag field may be flash cleared.

* * * * *